（12) United States Patent
Aizaki

(10) Patent No.: US 9,470,964 B2
(45) Date of Patent: Oct. 18, 2016

(54) PROJECTION DISPLAY APPARATUS

(71) Applicant: JVC KENWOOD CORPORATION, Yokohama-shi, Kanagawa (JP)

(72) Inventor: Takatsugu Aizaki, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 13/799,378

(22) Filed: Mar. 13, 2013

(65) Prior Publication Data

US 2013/0194549 A1 Aug. 1, 2013

Related U.S. Application Data

(63) Continuation of application No. PCT/JP2012/064533, filed on Jun. 6, 2012.

(30) Foreign Application Priority Data

Jun. 17, 2011 (JP) .................................. 2011-135349
Jan. 11, 2012 (JP) .................................. 2012-002869

(51) Int. Cl.
*G03B 21/20* (2006.01)
*G02B 7/00* (2006.01)
*G02B 27/28* (2006.01)
(Continued)

(52) U.S. Cl.
CPC ........... *G03B 21/2073* (2013.01); *G02B 7/005* (2013.01); *G02B 7/008* (2013.01); *G02B 27/286* (2013.01); *G03B 21/16* (2013.01); *G03B 21/208* (2013.01); *G02B 26/00* (2013.01)

(58) Field of Classification Search
CPC ............ G03B 21/208; G03B 21/2033; G03B 21/2073; H04N 9/315; H04N 9/317; H04N 9/3105; H04N 9/3152
USPC ......... 353/20, 30–31, 37–38, 94, 97, 98–99, 353/102, 34; 348/744–747, 750, 757, 759, 348/771; 362/290, 325, 352, 354; 349/5, 349/7–9, 66
See application file for complete search history.

(56) References Cited

U.S. PATENT DOCUMENTS 6,648,474 B2 * 11/2003 Katsumata et al. ............ 353/20
6,683,657 B1 * 1/2004 Miyawaki ..................... 348/743
(Continued)

FOREIGN PATENT DOCUMENTS

JP 2001228569 A 8/2001
JP 2002214598 A 7/2002
(Continued)

*Primary Examiner* — Sultan Chowdhury
(74) *Attorney, Agent, or Firm* — Nath, Goldberg & Meyer; Jerald L. Meyer; Leonid D. Thenor

(57) ABSTRACT

A first lens array splits light flux emitted from a light source. A second lens array is provided with a plurality of lens cells two-dimensionally arranged, on which light emitted from the first lens array is irradiated. A polarization converting element splits indefinite polarized light emitted from the second lens array into P polarized light and S polarized light, and conforms the split light to either the P polarized light or the S polarized light and emits the conformed light. A drive mechanism displaces the polarization converting element in a direction perpendicular to a polarization split direction along a surface on which the indefinite polarized light from the polarization converting element is incident.

5 Claims, 9 Drawing Sheets

(51) Int. Cl.
*G03B 21/16* (2006.01)
*G02B 26/00* (2006.01)

(56) References Cited

U.S. PATENT DOCUMENTS

| | | | |
|---|---|---|---|
| 7,357,510 B2* | 4/2008 | Kim et al. | 353/7 |
| 2001/0015775 A1 | 8/2001 | Yamamoto et al. | |
| 2004/0125246 A1* | 7/2004 | Okamori et al. | 349/5 |
| 2007/0201006 A1* | 8/2007 | Amano et al. | 353/31 |
| 2010/0328560 A1* | 12/2010 | Tanaka | 349/9 |
| 2013/0271673 A1* | 10/2013 | Katou | 348/744 |

FOREIGN PATENT DOCUMENTS

| | | |
|---|---|---|
| JP | 2003043419 A | 2/2003 |
| JP | 2004038096 A | 2/2004 |
| JP | 2004309853 A | 11/2004 |
| JP | 2007212496 A | 8/2007 |
| JP | 2010026403 A | 2/2010 |
| JP | 2010204280 A | 9/2010 |

* cited by examiner

PROJECTION DISPLAY APPARATUS

CROSS REFERENCE TO RELATED APPLICATION

This application is a Continuation of PCT Application No. PCT/JP2012/064533, filed on Jun. 6, 2012, and claims the priority of Japanese Patent Application No. 2011-135349, filed on Jun. 17, 2011 and No. 2012-002869, filed on Jan. 11, 2012, the entire contents of all of which are incorporated herein by reference.

BACKGROUND

The embodiment relates to a projection display apparatus that modulates light incident on display elements according to an image signal, and emits the modulated light to project on a screen so as to display an image. In particular, the embodiment relates to a projection display apparatus capable of preventing deterioration of a polarization converting element caused by heat.

Projection display apparatuses using liquid crystal display elements that modulate and emit incident light are in widespread use. In recent projection display apparatuses, polarized light is incident on liquid crystal display elements. Therefore, indefinite polarized light emitted from a light source is conformed to either first polarized light or second polarized light by a polarization converting element, so as to increase light use efficiency.

The polarization converting element is provided with a polarizing beam splitter (PBS) prism that splits the incident indefinite polarized light into first polarized light and second polarized light perpendicular to each other, and is provided with half-wave plates that convert the first polarized light into the second polarized light, or the second polarized light into the first polarized light.

The polarization converting element is likely to be heated since light flux emitted from the light source is collected thereon. The PBS prism and the half-wave plates are bonded together by use of an adhesive, and the PBS prism itself is formed of plural prisms that are also bonded to each other by the adhesive. Once the polarization converting element is heated due to the collected light flux, the adhesive is degraded through an oxidation process and a photochemical reaction process.

When the half-wave plates are made of polycarbonate which is an organic material, the plates are easily deteriorated since polycarbonate is relatively sensitive to heat. Thus, the polarization converting element is generally cooled by a cooling fan.

SUMMARY

Even if cooled by air, the polarization converting element deteriorates if heated and kept at a high temperature for a long period of time, which leads to reliability degradation. This problem is also caused in the case in which half-wave plates are made of crystal which has relatively high resistance to heat as described in Japanese Patent Unexamined Publication No. 2004-309853. Therefore there is a requirement to reduce deterioration of the polarization converting element when it is heated to a high temperature because of the collected light.

It is an object of the embodiment to provide a projection display apparatus capable of reducing deterioration of the polarization converting element.

In order to solve the conventional problem, an aspect of the embodiment provides a projection display apparatus including a light source; a first lens array in which a plurality of lens cells is two-dimensionally arranged and split light flux emitted from the light source; a second lens array in which a plurality of lens cells corresponding to the plurality of lens cells in the first lens array is two-dimensionally arranged, and on which light emitted from the first lens array is incident; a polarization converting element that splits indefinite polarized light emitted from the second lens array into first polarized light and second polarized light, and conforms the split indefinite polarized light to either the first polarized light or the second polarized light and emits the conformed indefinite polarized light by converting the first polarized light to the second polarized light or converting the second polarized light to the first polarized light; and a drive mechanism that displaces the polarization converting element in one direction perpendicular to a polarization split direction in the polarization converting element along a surface of the polarization converting element on which the indefinite polarized light is incident.

DETAILED DESCRIPTION

Figure 1:
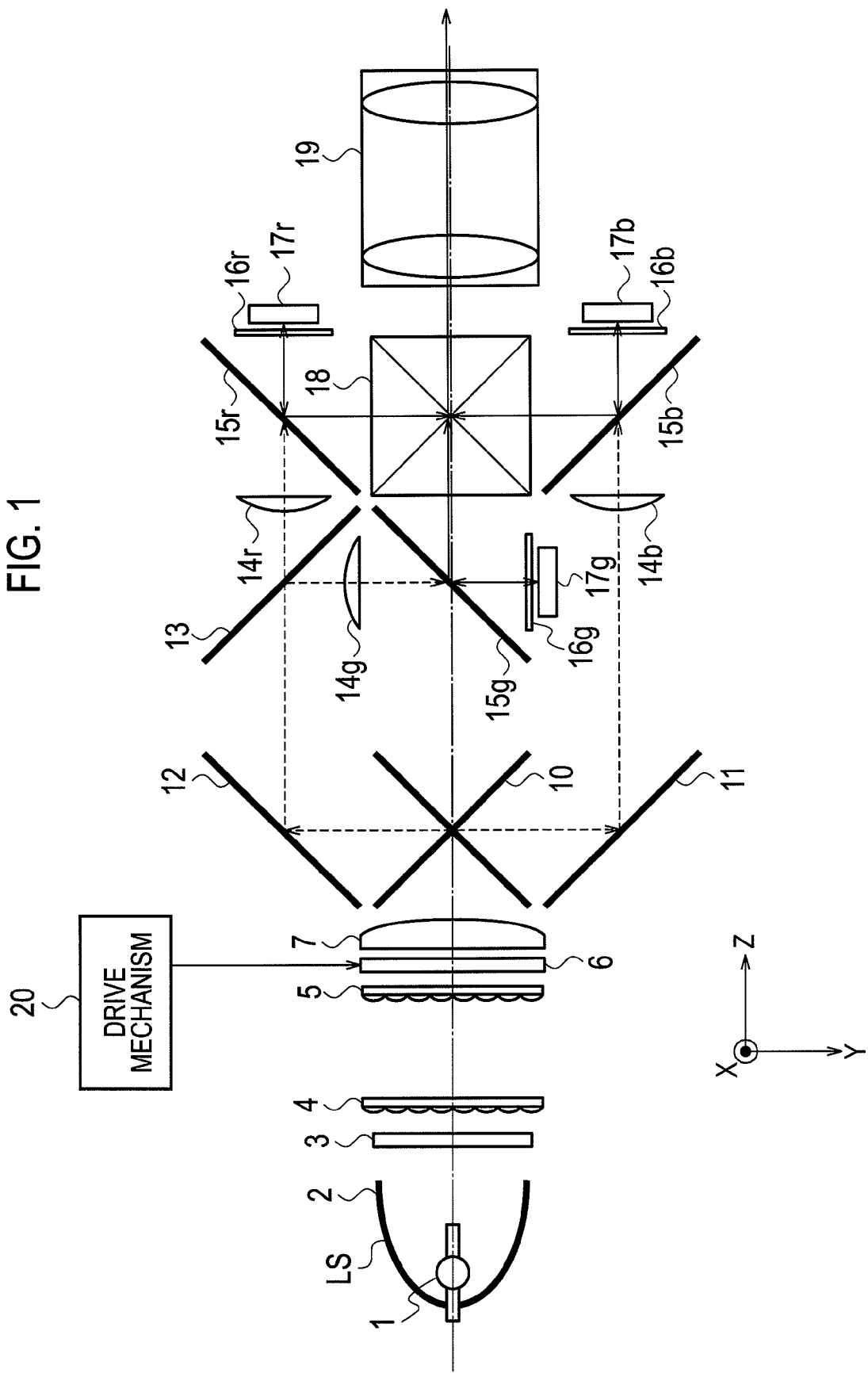
FIG. 1 is a configuration view showing a projection display apparatus of an embodiment.

Hereinafter, a projection display apparatus according to an embodiment will be explained with reference to the attached drawings. As shown in FIG. 1, a light source LS includes a discharge lamp 1 of a two metal cap type, and a reflector 2 that reflects light emitted from the discharge lamp 1 in an optical axis direction (in the Z direction). As for the discharge lamp 1, a lamp that emits white light such as a high pressure mercury lamp or a metal halide lamp is used.

The reflector 2 has a reflection surface that is a paraboloid of revolution having an optical axis. The light emitted from the discharge lamp 1 is reflected by the reflection surface, and emitted as illumination light parallel to the optical axis. Alternatively, the reflector 2 may have a reflection surface that is an ellipsoid of revolution having an optical axis. In this case, the reflection surface of the reflector 2 is provided with a lens system that makes the illumination light into approximately parallel light.

After first passing through a cold filter 3 that cuts out ultraviolet rays and infrared rays, the light emitted from the light source LS is then incident on a first lens array 4. As shown in (a) and (b) of FIG. 2, the first lens array 4 is formed in such a manner that a plurality of lens cells 4a having a rectangular shape similar to display areas of reflective liquid crystal display elements 17b, 17g and 17r described later, is arranged in a horizontal direction (the X direction) and a vertical direction (the Y direction).

Figure 2:
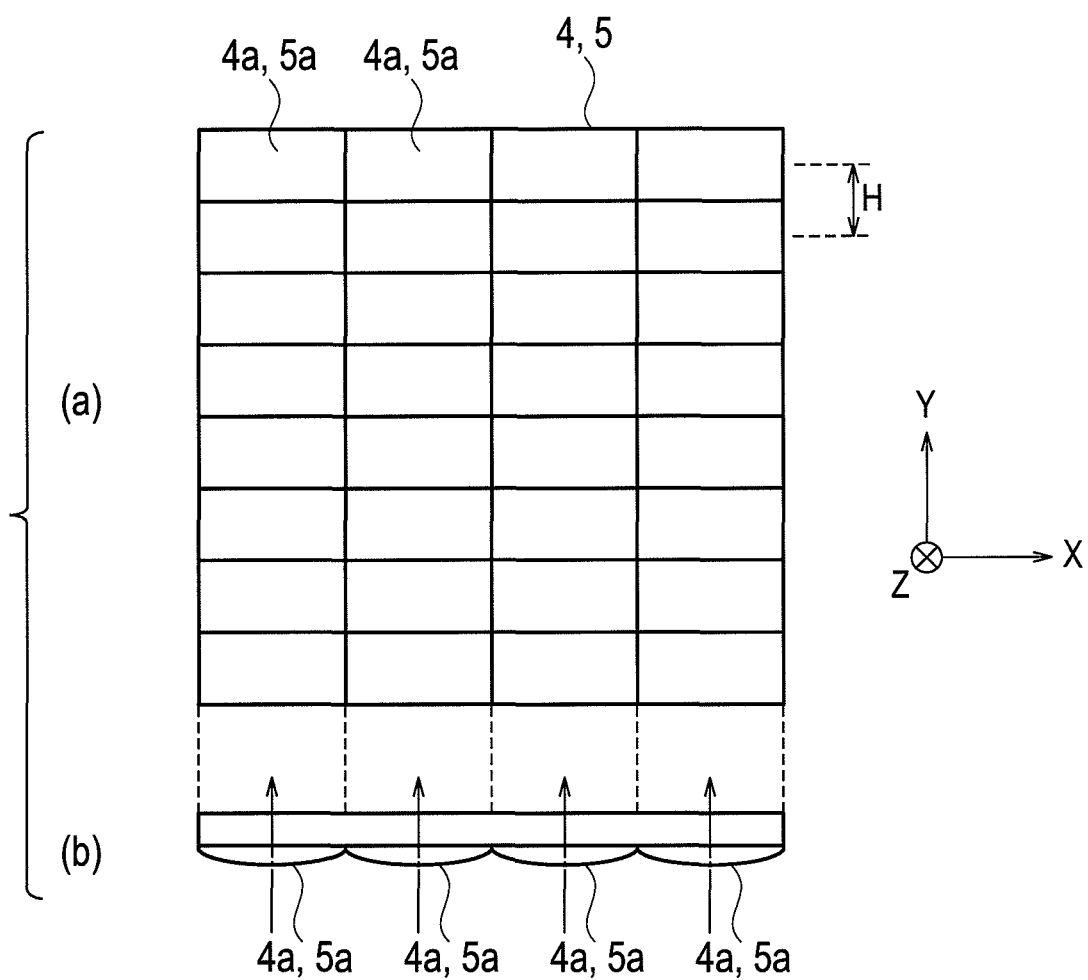
FIG. 2 is a view showing a configuration example of lens arrays 4 and 5 in FIG. 1.

In FIG. 2, (a) is a front view of the first lens array 4 when viewed from the Z direction, and (b) is a side view of the first lens array 4 when viewed from above. A lens pitch of the respective lens cells 4a in the vertical direction is defined as H.

The first lens array 4 is formed in such a manner as to refract and spatially divide the light flux from the reflector 2. The illumination light emitted from the first lens array 4 is incident on a second lens array 5. The first and second lens arrays 4 and 5 are also referred to as a fly eye lens or a fly eye integrator.

The second lens array 5 has the same structure as the first lens array 4, and is formed in such a manner that a plurality of lens cells 5a having a rectangular shape similar to the display areas of the liquid crystal display elements 17b, 17g and 17r is arranged in the X direction and in the Y direction, as shown in (a) and (b) of FIG. 2. A lens pitch of the respective lens cells 5a in the vertical direction is defined as H.

The lens cells 5a of the second lens array 5 are formed in such a way that there is a one-to-one relationship between the lens cells 5a of the second lens array 5 and the lens cells 4a of the first lens array 4. Thus, the illumination light exiting the lens cells 4a of the first lens array 4 is incident on the corresponding lens cells 5a of the second lens array 5, so as to form the same number of secondary light source images as the lens cells 4a of the first lens array 4 on the second lens array 5. Note that although the lens cells 4a and 5a are arranged in four lines in the X direction to simplify the explanation in FIG. 2, the lens cells 4a and 5a are arranged in more than four lines. The same applies to the number of rows in the Y direction.

Figure 3:
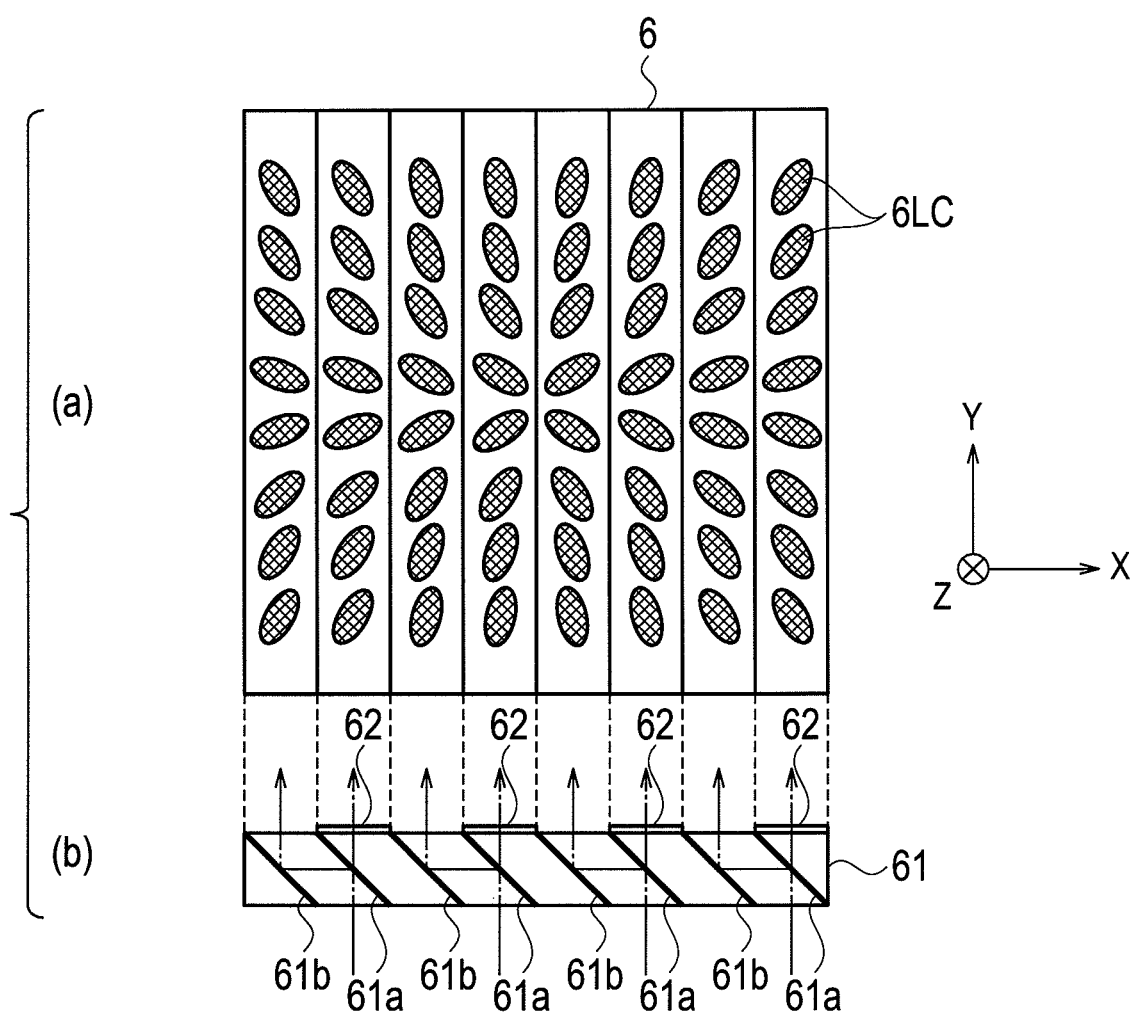
FIG. 3 is a view showing a configuration example of a polarization converting element 6 in FIG. 1.

The illumination light emitted from the second lens array 5 is incident on a polarization converting element 6. The configuration and function of the polarization converting element 6 are explained below with reference to (a) and (b) of FIG. 3. In FIG. 3, (a) is a front view of the polarization converting element 6 when viewed from the Z direction, and (b) is a side view of the polarization converting element 6 when viewed from above.

As shown in (b) of FIG. 3, the polarization converting element 6 includes a PBS prism 61 and half-wave plates 62. The polarization converting element 6 is formed in a flat plate in which a plurality of rectangular prisms provided with polarization split surfaces 61a is connected to each other. The rectangular prisms are provided with reflection surfaces 61b at each boundary thereof.

In the present embodiment, P polarized light of the indefinite polarized light incident on the polarization converting element 6 passes through the respective polarization split surfaces 61a and travels in a straight line, while S polarized light of the indefinite polarized light is reflected by the respective polarization split surfaces 61a and changes direction by making a right-angled turn with respect to the incidence direction of the indefinite polarized light. The right-angled direction with respect to the incidence direction of the indefinite polarized light is the polarization split direction. The S polarized light is then reflected by the respective reflection surfaces 61b and changes direction by making a right-angled turn.

As shown in (b) of FIG. 3, the half-wave plates 62 are bonded to a surface of the PBS prism 61 on the emission side of the P polarized light. The P polarized light emitted from the PBS prism 61 is thus converted into the S polarized light.

That is, the polarization converting element 6 according to the present embodiment conforms all the indefinite polarized light (randomly including the P polarized light and the S polarized light) to the S polarized light and emits the S polarized light. The indefinite polarized light maybe conformed to the P polarized light by the polarization converting element 6. When the indefinite polarized light is conformed to the P polarized light, the half-wave plates 62 are provided in the sections through which the S polarized light reflected by the reflection surfaces 61b passes.

In (a) of FIG. 3, the cross-hatched parts are high luminance parts 6LC in which light intensity is high when the illumination light emitted from the second lens array 5 is incident on the polarization converting element 6.

Figure 4:
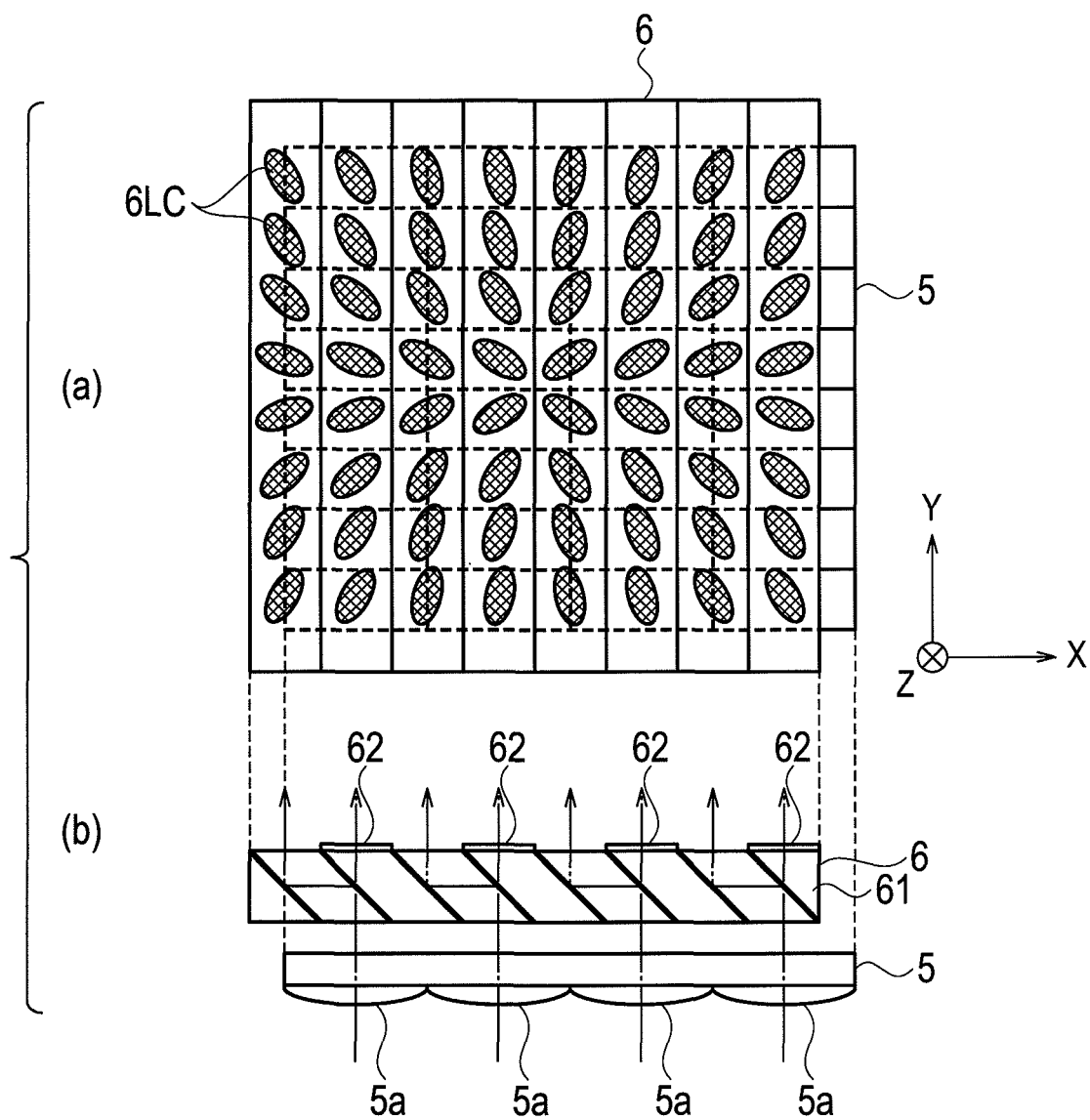
FIG. 4 is a view showing a positional relationship between the lens array 5 and the polarization converting element 6 in FIG. 1.

The specific positional relationship between the respective lens cells 5a of the second lens array 5 and the polarization converting element 6 is shown in (a) and (b) of FIG. 4. As shown in (a) and (b) of FIG. 4, the polarization converting element 6 is positioned in such a manner that centers of the respective lens cells 5a are aligned with centers of the respective half-wave plates 62 in the X direction. The width of the respective lens cells 5a in the X direction corresponds to the width of two rectangular prisms in the polarization converting element 6.

As shown in (a) and (b) of FIG. 4, the first and second lens arrays 4 and 5 and the polarization converting element 6 are actually different in size, and the respective center positions are different from each other. These optical members preferably have identical dimensions when installed in a case body. Therefore, as shown in FIG. 1, the first and second lens arrays 4 and 5 and the polarization converting element 6 visually have identical external dimensions.

In FIG. 1, the S polarized light emitted from the polarization converting element 6 is incident on a superposition lens 7. The superposition lens 7 functions to make centers of images of the respective lens cells 4a of the first lens array 4 coincident with centers of the respective liquid crystal display elements 17b, 17g and 17r, so that the images of the respective lens cells 4a of the first lens array 4 overlap each other on the respective liquid crystal display elements 17b, 17g and 17r.

The S polarized light emitted from the superposition lens 7 is split into blue light and red/green light by a B/RG split cross dichroic mirror 10. The optical path of the blue light is bent by a B mirror 11, and the blue light passes through a field lens 14b for blue, a wire grid PBS 15b for blue and a wave plate 16b for blue and is then incident on the liquid crystal display element 17b for blue.

The P polarized light modulated and reflected by the liquid crystal display element 17b for blue is reflected by the wire grid PBS 15b for blue, and travels toward a cross dichroic prism 18.

The optical path of the red/green light split by the B/RG split cross dichroic mirror 10 is bent by an RG mirror 12. The red/green light is split into red light and green light by an RG dichroic mirror 13.

The red light passes through a field lens 14r for red, a wire grid PBS 15r for red and a wave plate 16r for red, and is then incident on the liquid crystal display element 17r for red. The P polarized light modulated and reflected by the liquid crystal display element 17r for red is reflected by the wire grid PBS 15r for red, and travels toward the cross dichroic prism 18.

The green light passes through a field lens 14g for green, a wire grid PBS 15g for green and a wave plate 16g for green, and is then incident on the liquid crystal display element 17g for green. The P polarized light modulated and reflected by the liquid crystal display element 17g for green is reflected by the wire grid PBS 15g for green, and travels toward the cross dichroic prism 18.

The cross dichroic prism 18 synthesizes the incident red, blue and green lights. The synthesized lights are projected on a screen by a projection lens 19. The liquid crystal display elements 17b, 17g and 17r for blue, green and red modulate the incident blue light, green light and red light respectively, according to the blue component, green component and red component of the image signal. As a result, a projection image according to the image signal is projected on the screen.

Figure 5A:
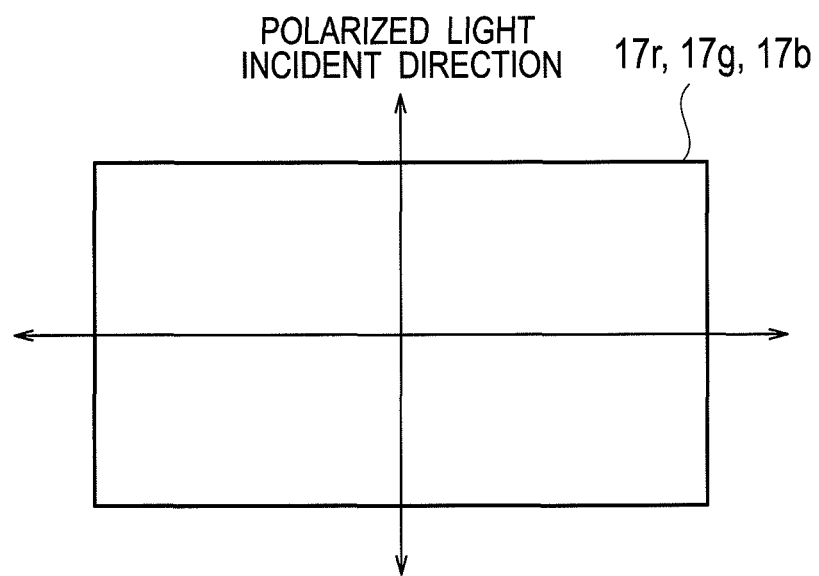
FIG. 5A is a plan view showing a schematic configuration of liquid crystal display elements 17b, 17g and 17r in FIG. 1.

The schematic configuration of the respective liquid crystal display elements 17b, 17g and 17r is explained below with reference to FIG. 5A and FIG. 5B. FIG. 5A is a plan view of the liquid crystal display elements 17b, 17g and 17r, and FIG. 5B is a cross-sectional view of the liquid crystal display elements 17b, 17g and 17r.

Figure 5B:
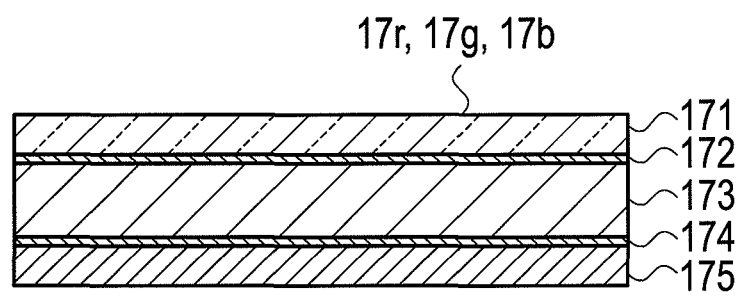
FIG. 5B is a cross-sectional view showing a schematic configuration of the liquid crystal display elements 17b, 17g and 17r in FIG. 1.

As shown in FIG. 5B, the respective liquid crystal display elements 17b, 17g and 17r include a transparent substrate 171 provided with transparent electrodes on the surface thereof, and an active matrix substrate 175 provided with reflecting electrodes for each pixel arranged in a matrix state. The transparent electrodes and the reflecting electrodes are opposed to each other. The transparent substrate 171 is located on the light incident side.

The transparent substrate 171 and the active matrix substrate 175 hold a liquid crystal layer 173 therebetween in which nematic liquid crystal having a prescribed pretilt angle is sealed. The respective surfaces of the transparent substrate 171 and the active matrix substrate 175 on the liquid crystal layer 173 side are provided with alignment films 172 and 174.

In the liquid crystal display elements 17b, 17g and 17r thus formed, the incident direction of the polarized light is a horizontal direction or a vertical direction on the plan surface of the respective liquid crystal display elements 17b, 17g and 17r, as shown in FIG. 5A.

Figure 6:
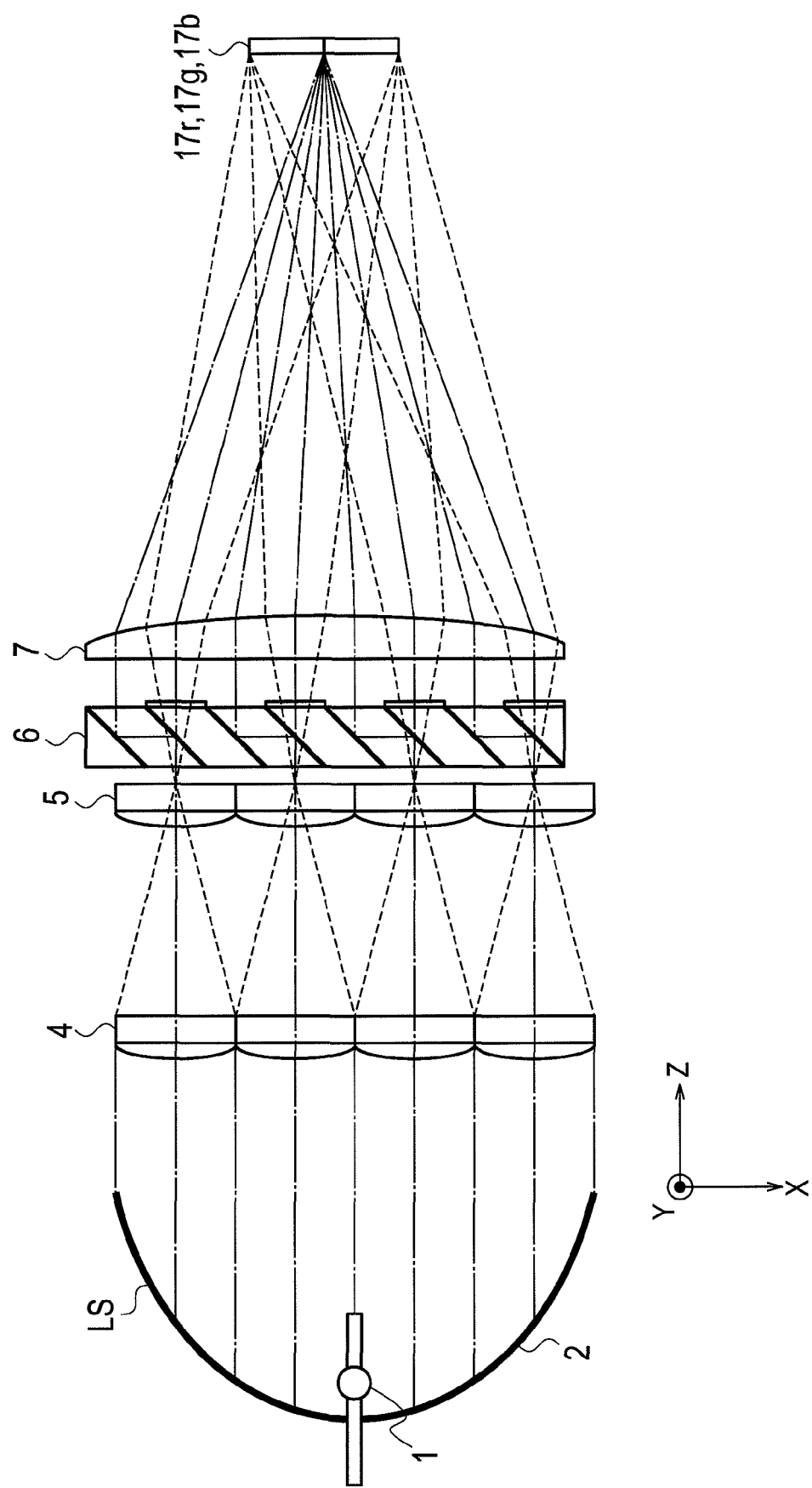
FIG. 6 is a conceptual view showing overlapped illumination light emitted from a light source LS in FIG. 1 onto the liquid crystal display elements 17b, 17g and 17r to form an image.

FIG. 6 is a conceptual view showing a state in which the light flux of the illumination light emitted from the light source LS is split by the respective lens cells 4a of the first lens array 4, and the split light flux passes through the second lens array 5, the polarization converting element 6 and the superposition lens 7 and overlaps on the liquid crystal display elements 17b, 17g and 17r to form an image.

The incident light through the lens cells 4a of the first lens array 4 is collected on the lens cells 5a of the second lens array 5 by refractive power of the respective lens cells 4a, so that secondary light source images equal in number to the lens cells 4a are formed. The light emitted from the polarization converting element 6 overlaps on the liquid crystal display elements 17b, 17g and 17r through the superposition lens 7 so as to form an image.

The light indicated by long dashed short dashed lines traveling in a direction perpendicular to the surface of the polarization converting element 6 (in the Z direction) is collected on the center of the respective liquid crystal display elements 17b, 17g and 17r. The light indicated by dashed lines traveling in a direction inclined to the direction perpendicular to the surface of the polarization converting element 6 is collected on the edges of the respective liquid crystal display elements 17b, 17g and 17r. Although the light reflected by the reflection surfaces 61b also includes the light that travels in the inclined direction, in order to simplify the explanation, only the light passing through the half-wave plates 62 in the inclined direction is shown in the figure.

Referring to FIG. 1, the polarization converting element 6 is displaced by the drive mechanism 20 in the Y direction, which is the longitudinal direction of the rectangular prisms.

Figure 7:
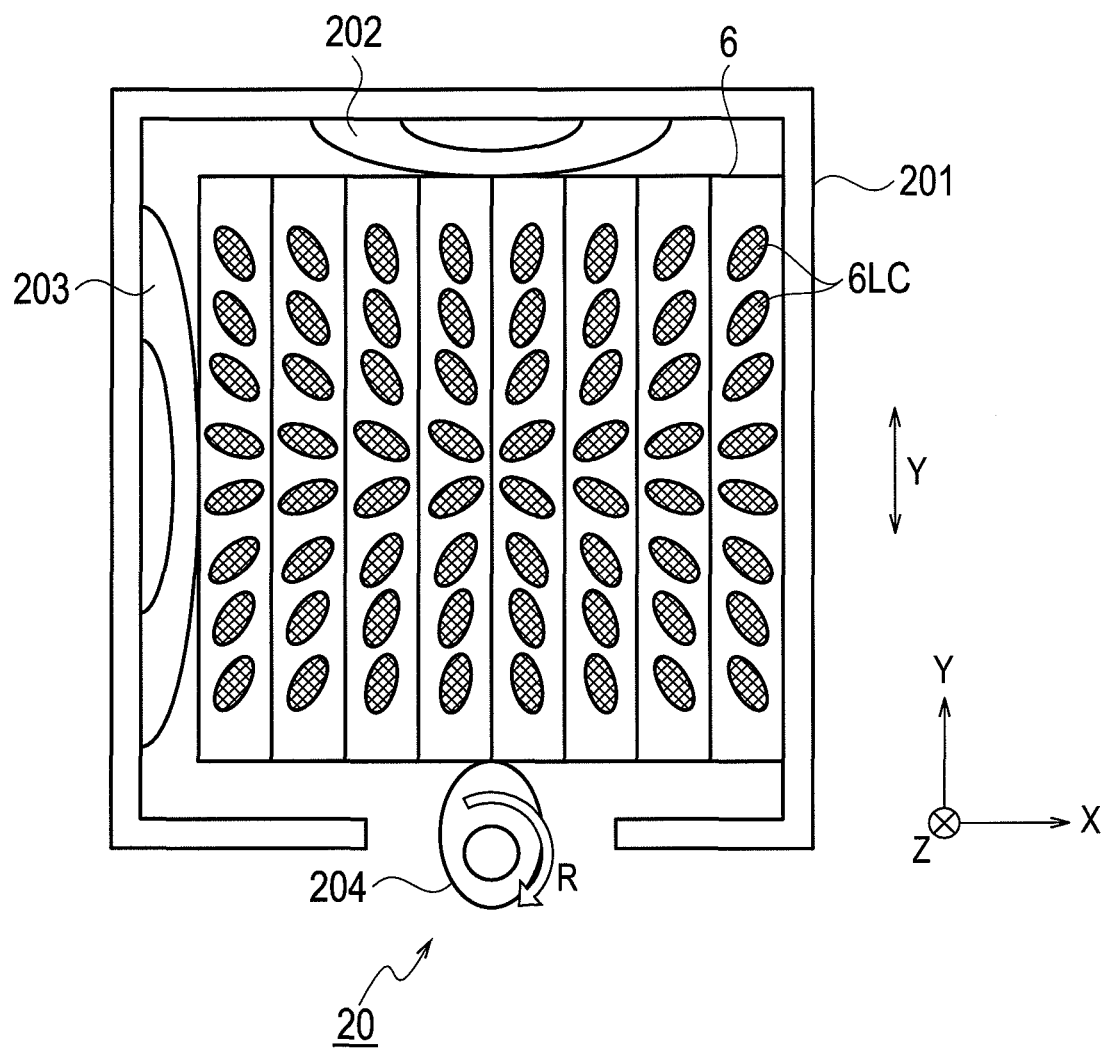
FIG. 7 is a view showing a configuration example of a drive mechanism 20 in FIG. 1.

A specific configuration example of the drive mechanism 20 is explained below with reference to FIG. 7. As shown in FIG. 7, the polarization converting element 6 is placed in a housing 201. The housing 201 is provided with a plate spring 202, which is an example of an elastic member, on the upper surface thereof. The housing 201 is further provided with a plate spring 203 on one side surface in the right and left direction (in the X direction) inside the housing 201.

The upper surface of the polarization converting element 6 is in contact with the plate spring 202 so that a downward force is added by the plate spring 202. The bottom surface of the polarization converting element 6 is in contact with an eccentric cam 204. The eccentric cam 204 is turned in an R direction by a drive such as a motor (not shown in the figure).

The polarization converting element 6 is interposed between the plate spring 202 and the eccentric cam 204. The polarization converting element 6 is displaced in the vertical direction (in the Y direction) by the rotation of the eccentric cam 204. FIG. 7 shows a state in which the polarization converting element 6 is located in the uppermost position. The plate spring 203 presses the polarization converting element 6 towards the right of FIG. 7. As a result, the polarization converting element 6 is located in a fixed position in the X direction.

As explained in FIG. 4, it is necessary to place the second lens array 5 and the polarization converting element 6 in a precise position in the X direction. The polarization converting element 6 is pushed to the inner surface of the housing 201 by the plate spring 203 so that the polarization converting element 6 is placed in a predetermined position in the X direction. Although the polarization converting element 6 is displaced in the Y direction, there is no influence on the X direction.

Figure 8A:
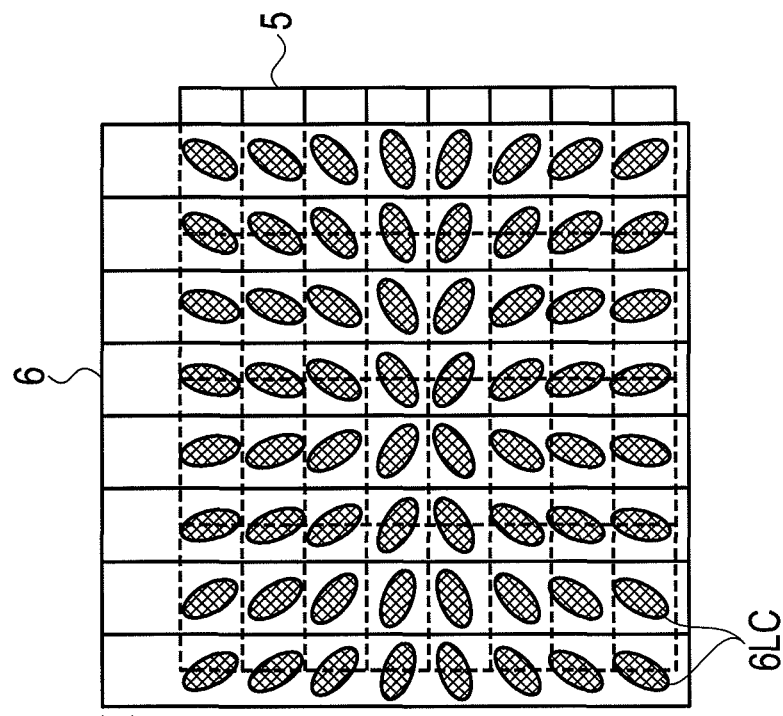
FIG. 8A is a view explaining displacement of the polarization converting element 6 by the drive mechanism 20, and showing a positional relationship between the second lens array 5 and the polarization converting element 6 when the polarization converting element 6 is located in the lowermost position.

The displacement of the polarization converting element 6 in the Y direction is further explained with reference to FIG. 8A and FIG. 8B. FIG. 8A shows a positional relationship between the second lens array 5 and the polarization converting element 6 in a state in which the polarization converting element 6 is located in the lowermost position. In this state, the center of the second lens array 5 in the Y direction is placed in the same position as the center of the polarization converting element 6 in the Y direction. This state is defined as the first state as a reference position of the polarization converting element 6 and the second lens array 5.

Figure 8B:
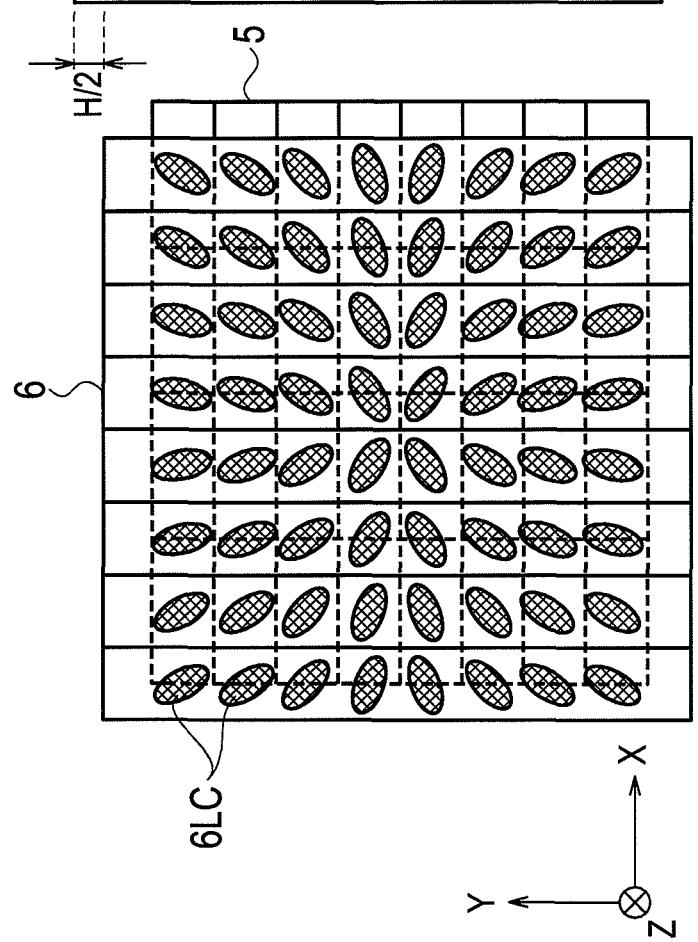
FIG. 8B is a view explaining displacement of the polarization converting element 6 by the drive mechanism 20, and showing a positional relationship between the second lens array 5 and the polarization converting element 6 when the polarization converting element 6 is located in the uppermost position.

FIG. 8B shows a positional relationship between the second lens array 5 and the polarization converting element 6 in a state in which the polarization converting element 6 is located in the uppermost position. The polarization converting element 6 in FIG. 8B is located in the position shown in FIG. 7. The polarization converting element 6 is pushed upward by the eccentric cam 204.

Although the present embodiment shows a mechanism in which the polarization converting element 6 is displaced by the eccentric cam 204, the present embodiment is not limited to this mechanism. For example, a lead screw may be provided in the housing 201 so that the polarization converting element 6 is displaced according to the number of revolutions of the lead screw.

An alternative mechanism is explained. The light source LS gradually deteriorates and the light emitting ability of the light source LS is thus reduced over time. As a result, the amount of light passing through the polarization converting element 6 is also reduced, and the temperature around the polarization converting element 6 decreases. In view of this, the plate springs for pressing the polarization converting element 6 are made of shape-memory metal or bimetal having a characteristic whereby elasticity and shape thereof change with temperature. Namely, the polarization converting element 6 is displaced according to the temperature of the plate springs.

The polarization converting element 6 is preferably displaced by the half pitch H in the vertical direction of the lens cells 5a of the lens array 5 (in the Y direction) between the state of FIG. 8A in which the polarization converting element 6 is located in the lowermost position and the state of FIG. 8B in which the polarization converting element 6 is located in the uppermost position.

The polarization converting element 6 is displaced in one direction along the surface of the polarization converting element 6 on which the light is incident, which is a direction perpendicular to the polarization split direction as explained in (b) of FIG. 3. When the polarization converting element 6 is shifted to the position shown in FIG. 8B, the light incident on the surface of the polarization converting element 6 is displaced downward by H/2.

The state in which the relative position of the polarization converting element 6 to the second lens array 5 in one direction is displaced by H/2 from the first state shown in FIG. 8A is defined as the second state. The drive mechanism 20 operates the polarization converting element 6 to switch between the first state and the second state.

Figure 9:
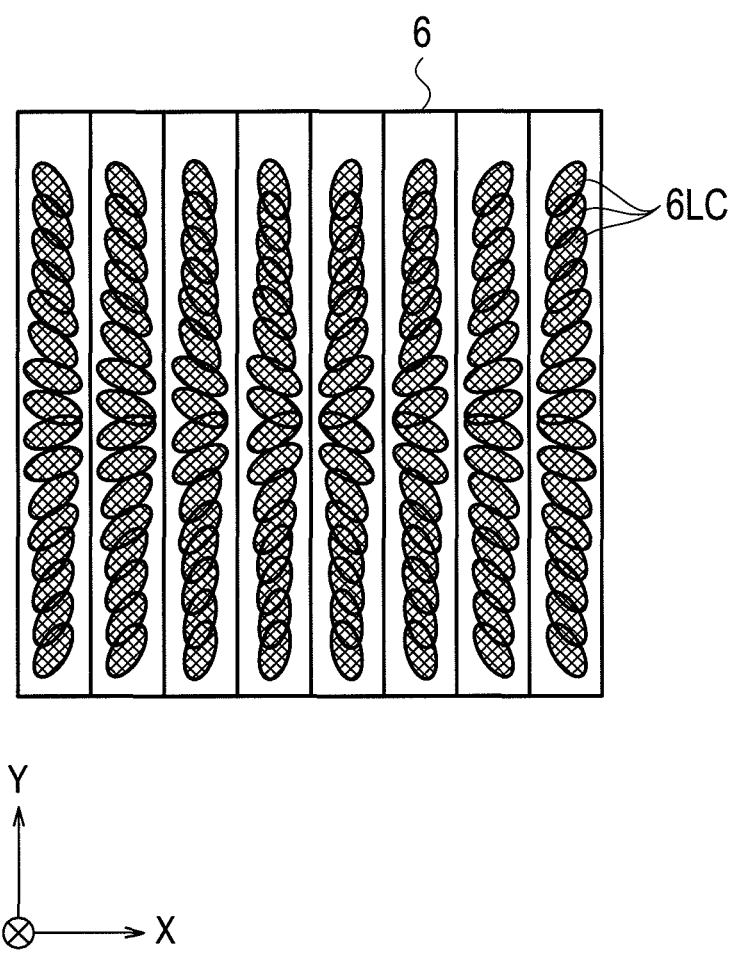
FIG. 9 is a view showing a state of light incident on the polarization converting element 6 after displacement of the polarization converting element 6 by the drive mechanism 20.

When the polarization converting element 6 is displaced as shown in FIG. 8A and FIG. 8B, the high luminance parts 6LC shown in FIG. 9 appear in the polarization converting element 6. Since the polarization converting element 6 is displaced by H/2, the positions of the high luminance parts 6LC shown in FIG. 8A are shifted in the Y direction to the positions of the high luminance parts 6LC shown in FIG. 8B. The respective high luminance parts 6LC shown in FIG. 8B are positioned approximately between the respective high luminance parts 6LC shown in FIG. 8A. Therefore, the high luminance parts 6LC are not always located in a fixed position but dispersed. As a result, deterioration of the polarization converting element 6 can be prevented.

In the explanations made above, the polarization converting element 6 is displaced selectively to the position (the first state) shown in FIG. 8A or the position (the second state) shown in FIG. 8B in the Y direction. However, the position of the polarization converting element 6 in the Y direction may be changed continuously between the position shown in FIG. 8A and the position shown in FIG. 8B.

That is, the drive mechanism 20 may operate the polarization converting element 6 to continuously shift from the first state to the second state and from the second state to the first state while taking predetermined time for each displacement. The continuous displacements of the polarization converting element 6 in the Y direction make the high luminance parts 6LC into a connected state in the Y direction.

Although the amount of displacement of the polarization converting element 6 is set to H/2 in the present embodiment, an amount of displacement is not limited to H/2. The polarization converting element 6 may be displaced in such a manner that the region in the polarization converting element 6 on which light is constantly illuminated is as small as possible. More preferably, the polarization converting element 6 is displaced in such a manner that there is no region on which light is constantly illuminated.

According to the projection display apparatus described above, it is possible to reduce deterioration of the polarization converting element.

The present invention is not limited to the embodiment described above, and it will be apparent to a person skilled in the art that various modifications can be made within the scope of the present invention. Although the present embodiment exemplified the constitution in which the reflective liquid crystal display elements 17b, 17g and 17r are used, transmissive liquid crystal display elements may also be used. The light source is not limited to a lamp, and a light-emitting diode (LED), a laser and an excitation light source can also be used as appropriate.

The present invention can be applied to appropriate projection display apparatuses that include a pair of lens arrays and a polarization converting element.

What is claimed is:

1. A projection display apparatus, comprising:
   a light source;
   a first lens array in which a plurality of lens cells is two-dimensionally arranged and split light flux emitted from the light source;
   a second lens array in which a plurality of lens cells corresponding to the plurality of lens cells in the first lens array is two-dimensionally arranged, and on which light emitted from the first lens array is incident;
   a polarization converting element configured to split indefinite polarized light emitted from the second lens array into first polarized light and second polarized light, and conform the split indefinite polarized light to either the first polarized light or the second polarized light and emit the conformed indefinite polarized light by converting the first polarized light to the second polarized light or converting the second polarized light to the first polarized light; and
   a drive mechanism configured to linearly displace the polarization converting element in one direction, the one direction being perpendicular to both an incident direction in which the indefinite polarized light is incident and a polarization split direction in the polarization converting element, the polarization split direction being perpendicular to the incident direction, along a surface of the polarization converting element on which the indefinite polarized light is incident.

2. The projection display apparatus according to claim 1, wherein the drive mechanism is configured to displace the polarization converting element in the one direction by a half of a pitch of the plurality of lens cells in the second lens array.

3. The projection display apparatus according to claim 2, wherein the drive mechanism is configured to operate the polarization converting element to switch between a first state in which the polarization converting element and the second lens array are located in a reference position in the one direction and a second state in which a positional relationship between the polarization converting element and the second lens array in the one direction is displaced by the half of the pitch from the first state.

4. The projection display apparatus according to claim 3, wherein the drive mechanism is configured to operate the polarization converting element to selectively switch between the first state and the second state.

5. The projection display apparatus according to claim 3, wherein the drive mechanism is configured to operate the polarization converting element to continuously shift from the first state to the second state and from the second state to the first state while taking predetermined time for each shift.

\* \* \* \* \*